United States Patent [19]

Brown

[11] Patent Number: 5,354,036
[45] Date of Patent: Oct. 11, 1994

[54] PORTABLE UTILITY PEN HAVING DUAL FUNCTION COMPONENTS

[75] Inventor: Burgess J. Brown, Eubank, Ky.

[73] Assignee: Stephens Pipe and Steel, Inc., Russell Springs, Ky.

[21] Appl. No.: 53,513

[22] Filed: Apr. 26, 1993

[51] Int. Cl.$^5$ .............................................. E04H 17/00
[52] U.S. Cl. ......................................... 256/25; 256/65; 256/45
[58] Field of Search ..................... 256/24, 25, 26, 32, 256/65, 59, 45; 119/20

[56] References Cited

U.S. PATENT DOCUMENTS

| | | | |
|---|---|---|---|
| 1,251,926 | 1/1918 | Schlesinger | 119/20 |
| 1,463,459 | 7/1923 | Comstock | 256/25 |
| 3,072,385 | 1/1963 | Johnson . | |
| 3,336,908 | 8/1967 | Swanson . | |
| 3,469,822 | 9/1969 | O'Brien | 256/25 |
| 3,744,456 | 7/1973 | Wheeler | 119/20 |
| 3,940,114 | 2/1976 | Rivelli | 256/25 |
| 4,067,547 | 1/1978 | Peters . | |
| 4,145,031 | 3/1979 | Baker | 256/65 |
| 4,422,622 | 12/1983 | Broski, Jr. . | |
| 5,078,365 | 1/1992 | Fultz | 256/1 |

FOREIGN PATENT DOCUMENTS

| | | | |
|---|---|---|---|
| 266019 | 3/1989 | Fed. Rep. of Germany | 119/20 |
| 1001860 | 12/1949 | France | 256/25 |
| 2559641 | 8/1985 | France | 119/20 |
| 812811 | 4/1959 | United Kingdom | 256/32 |

Primary Examiner—Randolph A. Reese
Assistant Examiner—Anthony Knight
Attorney, Agent, or Firm—Camoriano & Smith

[57] ABSTRACT

A portable utility pen having components forming both the utility pen and, when packaged, an internal skeleton to the container at the corners and sides when packaged so as to minimize crushing of the container under pressure due to vertical storage or display of a plurality of the containers. For forming the pen, the components comprise plurality of upper rails that have complimentary securing fittings and form a first essentially rectangular configuration defining a first gap when said upper rails are fitted together and a plurality of lower rails having complimentary securing fittings for forming a second essentially rectangular configuration defining a second gap spaced below said first gap when said lower rails are fitted together. The rectangular configurations are joined in a spaced apart arrangement by a plurality of upright members that have complimentary fittings with the rails at the corners thereof forming the rectangular relationships. The gaps form an opening filled by a frame member having a gate swingable between open and shut positions. The frame member is removably secured to the first and second rectangular configurations.

9 Claims, 4 Drawing Sheets

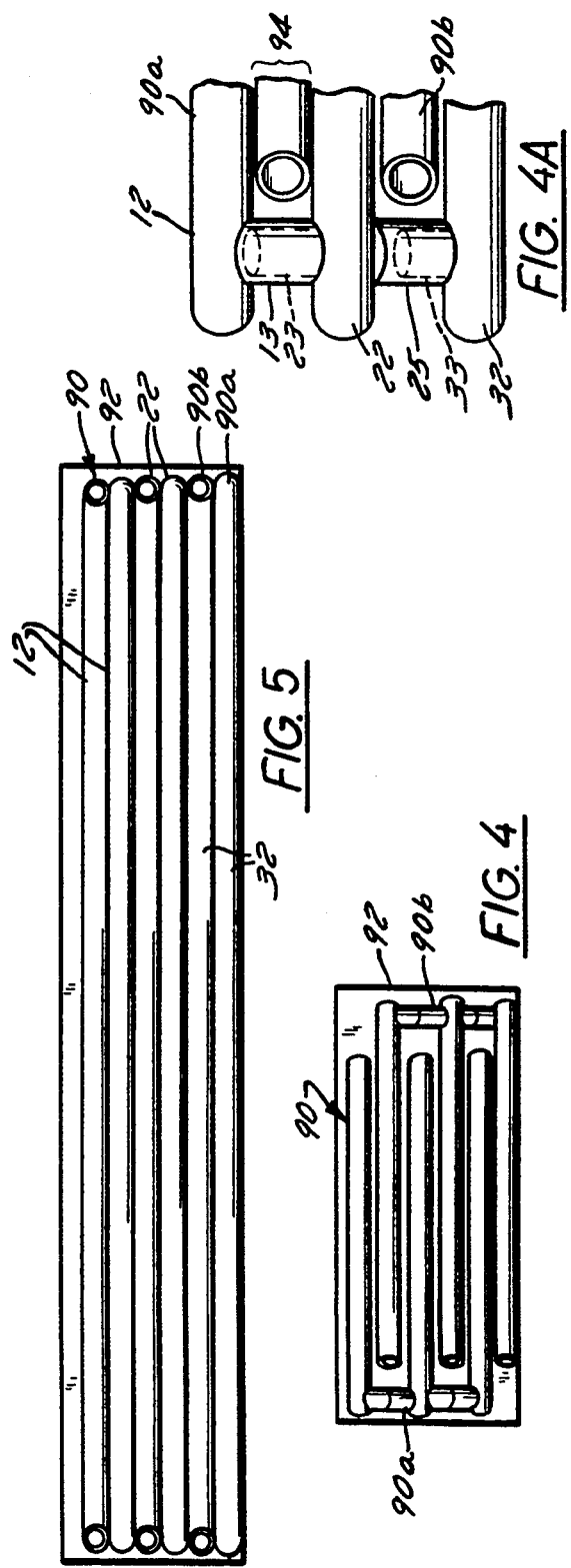
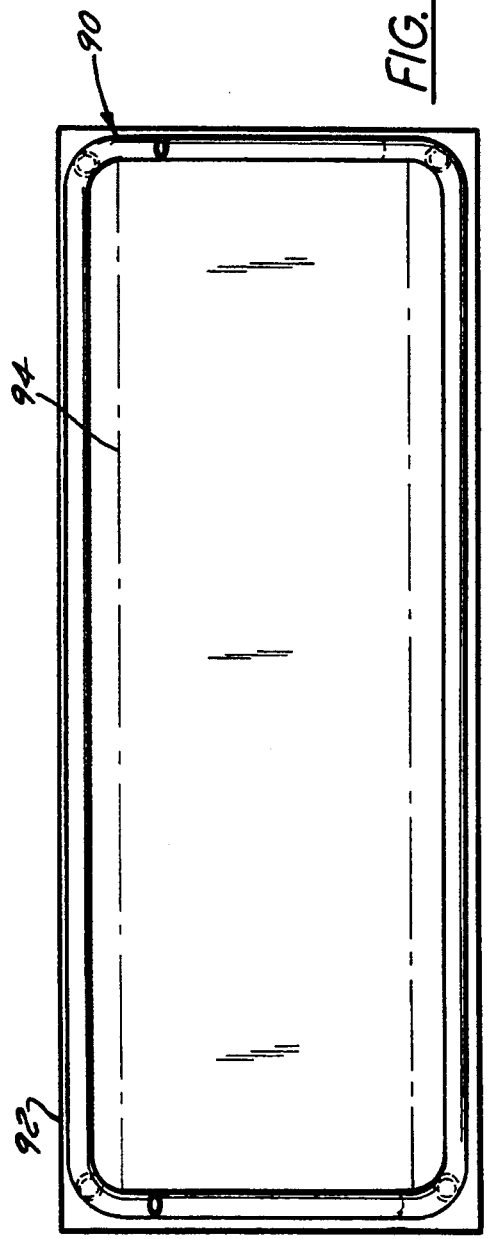
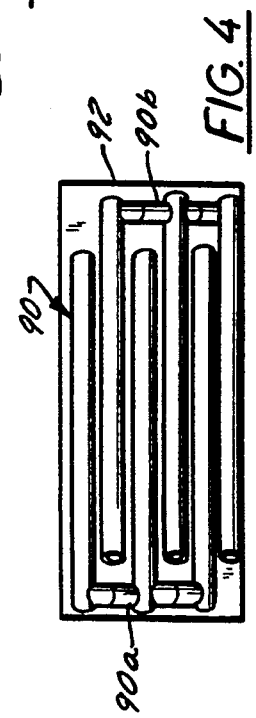

PORTABLE UTILITY PEN HAVING DUAL FUNCTION COMPONENTS

FIELD OF THE INVENTION

This invention relates a portable utility pen capable of being packaged in a small container and stored and displayed on a shelf of a retail store and, more particularly, to a portable utility pen adapted to be packaged in a compact form and having a simple structure for tensioning the flexible fencing material once the frame has been erected.

BACKGROUND OF THE INVENTION

Prefabricated and portable utility pens for enclosing pets have long been available in the market place. Despite allegations of portability, most prior art fences are complex in structure, requiring considerable time for erection and special equipment to handle and move them. Moreover, few can be packaged compactly in containers for ordinary handling and placing on shelving of retail stores for display purposes and ready access to the public. Effective vertical stacking of the containers in storage or on display shelves requires the use of structural strong container materials with sufficient strength to withstand the considerable pressure exerted against the bottom most containers. Otherwise considerable damage can occur to the containers. The cost of container materials to withstand treatment are substantial higher than the normal corrugated paper containers.

Finally, tensioning of the fence material has to date required complex and heavy mechanisms that limit the portability of the packaged fence components. This also complicates and lengthens erection time.

Some attempts have been made to provide light weight portable fencing by fabricating the fence rails and the gate assembly of telescoping hollow metal tubes and woven fence fabric. The structure provided by the telescoping tubes is indeed light weight but has limited utility since the integrity is not sound. This may cause significant problems when large animals are to be enclosed.

An early example of a portable pen is described in U.S. Pat. No. 3,072,385 issued on Jan. 8, 1963 to Johnson. Four end posts connected by top and bottom horizontal struts are circumscribed by flexible fencing material fabric. Tensioning of the fabric is provided by a capstan located at one of the end posts. A preassembled gate structure is also provided.

Another fence structure of interest is discussed in U.S. Pat. No. 4,422,622 issued on Dec. 27, 1983 to Broski. The Broski patent illustrates the use of individual fence panels made with hollow telescopically fitting tubes for the uprights and upper and lower rails. Each panel is a separately assembled structure having separate fencing fabric tensioned for each panel. The individual panels are then secured to each other and to a preassembled gate assembly to form the enclosure.

None of the prior art portable fences provide any solution to the problem of packaging the fences for compact storage and display. Portability is largely a matter of opinion as the combination of fence components and the container produce a heavy often bulky package, making storage and display of more than one container problematical.

Thus, a paramount object of the present invention is to provide a light weight portable fence with components that can be arranged within the container to provide the container with internal structure sufficient to withstand considerable outside pressure thereby allowing the container to be composed of ordinary packaging materials.

A further object of the present invention is to provide a fence of made of light weight components but with significant assembled integrity to withstand considerable interior force.

Another object of the present invention is to provide a utility fence portable in nature, easily assembled and disassembled, which has internal structural integrity thereby minimizing damage to the container due to vertical stacking of the containers for storage and display purposes.

A still another object of the present invention is to provide a utility pen that has a simple structure for tensioning the fencing fabric circumscribing essentially the entire perimeter of the rail structure of the utility pen.

Yet another object of the present invention is to provide a utility pen that has a frame member including a swingable gate mounted within the frame member for positioning within the utility pen.

SUMMARY OF THE INVENTION

A portable utility pen according to the present invention is initially adapted to be packaged in component parts within a container for transporting and storing the pen when not in use. Some of the component parts of the fence pen structure can be used to form an internal skeleton designed to prevent the container from being damaged or crushed due to vertical storing or displaying of a multiplicity of the containers. The components when assembled into the utility pen comprise a plurality of upper rails that have complimentary securing fittings and form a first essentially rectangular configuration defining a first open space when said upper rails are fitted together and a plurality of lower rails having complimentary securing fittings for forming a second essentially rectangular configuration defining a second open space spaced below said first open space when said lower rails are fitted together. The rectangular configurations are joined in a spaced apart arrangement by a plurality of upright members that have complimentary fittings with the rails forming the rectangular relationships. The two open spaces are filled by a frame member having a gate component swingable between open and shut positions. The frame member is removably secured to the first and second rectangular configurations. Fencing material in rolled form when in said container has an unrolled length sufficient to circumscribe the outside of the rectangular configurations from one side of the gate frame member to the other and is removably attached to the sides thereof. The utility pen is further provided with a tensioning structure that cooperates with the frame member to adjust the tension of the material about the rectangular configurations.

BRIEF DESCRIPTION OF THE DRAWINGS

FIG. 4 is an end view of the utility pen disassembled and packaged in a container showing the cooperative stacking of the C-shaped side rails within the container to form an internal skeleton;

FIG. 4A is an enlarged perspective view illustrating the connecting interaction between the stacked side rails;

FIG. 5 is a side view of the component stacking illustrated in FIG. 4; and

FIG. 6 is top view of the component stacking illustrated in FIG. 4.

DETAILED DESCRIPTION OF THE PREFERRED EMBODIMENT

Figure 1:
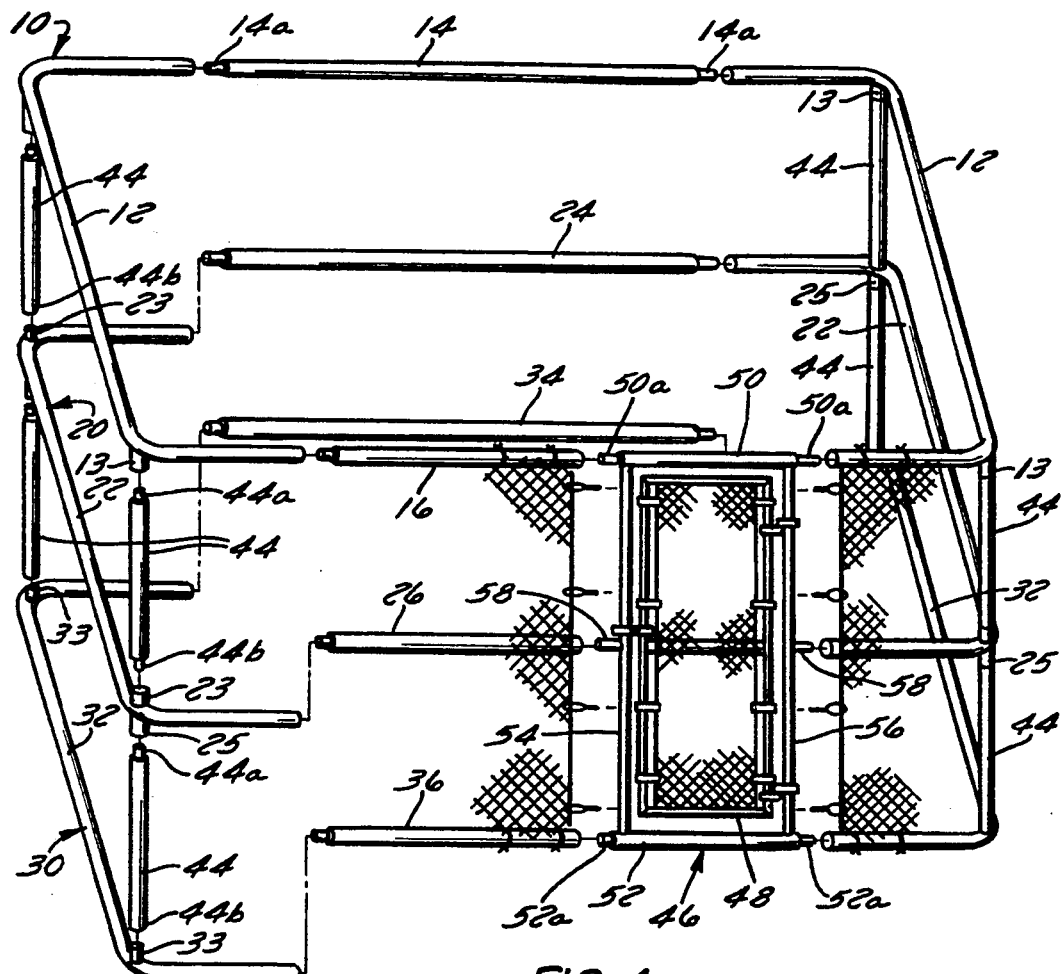
FIG. 1 is an exploded perspective of the utility pen of the present invention.

In the exploded perspective of FIG. 1, it may be seen that utility pen is comprised of three sets of horizontally positioned, tubular rails, i.e., upper set of rails 10, intermediate set of rails 20, and lower set of rails 30. Each set when assembled defines an identical rectangular configuration. The upper set of rails 10 include a pair of "C-shaped" end rails 12, a back rail 14, and a front rail 16. For purposes of this description, the descriptive expression "C-shaped" is intended to define a hollow tube member having a long side extending between two right angle elbows integrally connected to a pair of shorter lengths or arms of tubing with distal ends.

Back rail 14 is provided with reduced diameter ends 14a that snugly or press fit within the inner diameter of the adjacent ends of one end of each of the end rails 14. Front rail 16, being shorter than back rail 14, is secured to one end of one of the rails 12 and thus forms a gap in the rectangular configuration defined by rails 12.

Similarly, the intermediate set of rails 20 has a pair of C-shaped rails 22, back rail 24, and front rail 26 while the lower set of rails 30 has a pair of C-shaped rails 32, back rail 34, and front rail 36. As with the upper set of rails, the back rails 24 and 34 have reduced diameter ends that snugly or press fit within the inner diameter of the distal ends of the arms of respective C-shaped end rails 22 and 32. While it is preferable that the ends of the tubes (adapted to be secured to one another) have complimentary fittings allowing a proper and firm securing arrangement, other means such as fasteners could also be used to secure the tube endings as long as the compact grouping of the components within a container is not sacrificed as discussed below.

Each elbow of the C-shaped rails 12 is provided with a downwardly projecting annular boss 13. For reasons described below in conjunction with the packaging, the length of bosses 13 are slightly greater than the outer diameter of the various C-shaped rails. Additionally, each elbow of C-shaped rails 22 have an upwardly projecting annular boss 23 and a downwardly projecting annular boss 25. Again each downwardly projecting boss has a length slightly larger than the outer diameters of the various C-shaped rails. Finally, each elbow of C-shaped rail 32 has an upwardly projecting annular boss 33. For reasons set forth below, it is important to note that the internal diameter of the downwardly projecting bosses 13 and 25 are provided with internal diameters greater than the diameters of the upwardly projecting bosses 23 and 33, respectively.

Figure 1A:
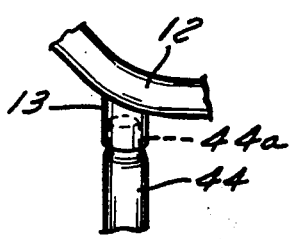
FIG. 1A is a view of the corner assembly illustrating the housing of upward fastener projections within the downward fastener projections of the various C-shaped side rails when the pen is assembled.

As may best be seen by viewing both FIGS. 1 and 1A together, a plurality of tubular upright members 44 serve to space apart and firmly secure the rectangular configuration of the three sets of rails. Preferably, the upper distal ends 44a of members 44 are provided with a reduced diameter adapted to be pressed fit within the internal diameters of downwardly projecting bosses 13 and 25. The other distal ends 44b fit over upwardly projecting bosses 23 and 33. This arrangement minimizes the collection of moisture within the various rails as all of the open ends of the upwardly projecting bosses and upright members are completely enclosed.

While, alternatively, the pen in accordance with the present invention may be formed with two rectangular configurations, it is preferred to use three configurations. The integrity of the pen is enhanced with three configurations and is particularly desirable when the fencing is under high tension and larger animals may be enclosed.

The gaps formed within the rectangular configurations provide a gate space in which the preassembled gate frame 46 and gate 48 may be placed. The gate frame is comprised of a top and bottom tubular cross members 50 and 52 integrally joined by a pair of spaced tubular columns 54 and 56. Members 50 and 52 have a reduced diameter ends 50a and 52a, respectively, that snugly fit within the inner diameters of the ends of the respective upper and lower front rails 16 and 26. Additionally, columns 54 and 56 are provided with horizontally extending fingers 58 that serve the identical purpose with respect to intermediate front rail 26.

Figure 3:
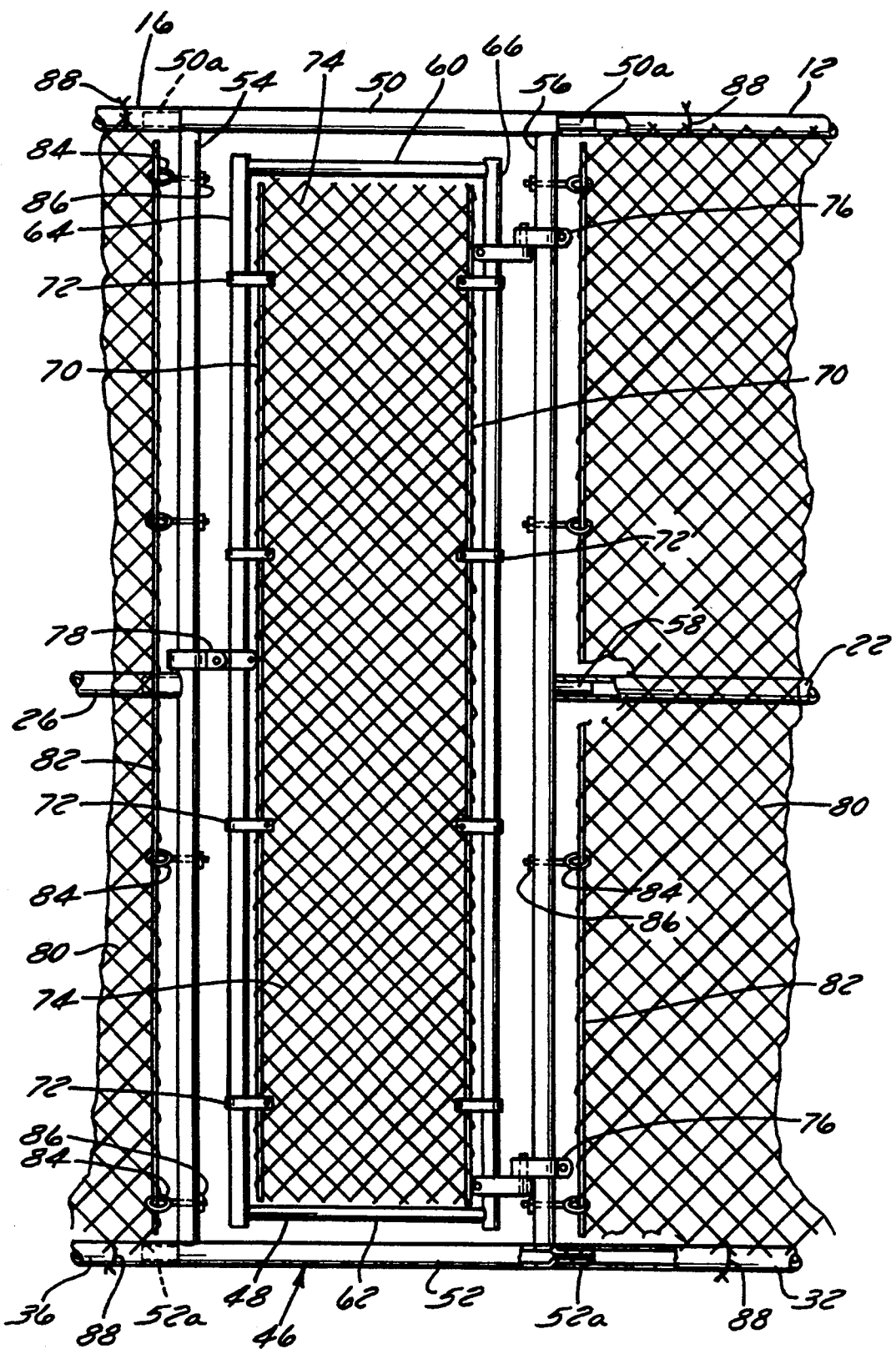
FIG. 3 is a front view of the gate frame in place within the utility pen assembly.

Gate 48, as best seen in FIG. 3, has a frame comprising top cross tube 60, bottom tube 62, and side tubes 64 and 66. A pair of tensioning rods 70, appropriately secured by brackets 72 to side tubes 64 and 66, are threaded through the ends of fencing fabric 74 stretched between rods 70. Gate 48 is pivotally attached to frame 46 by hinges 76 and may be latched shut within gate frame 46 by latch 78.

Figure 2:
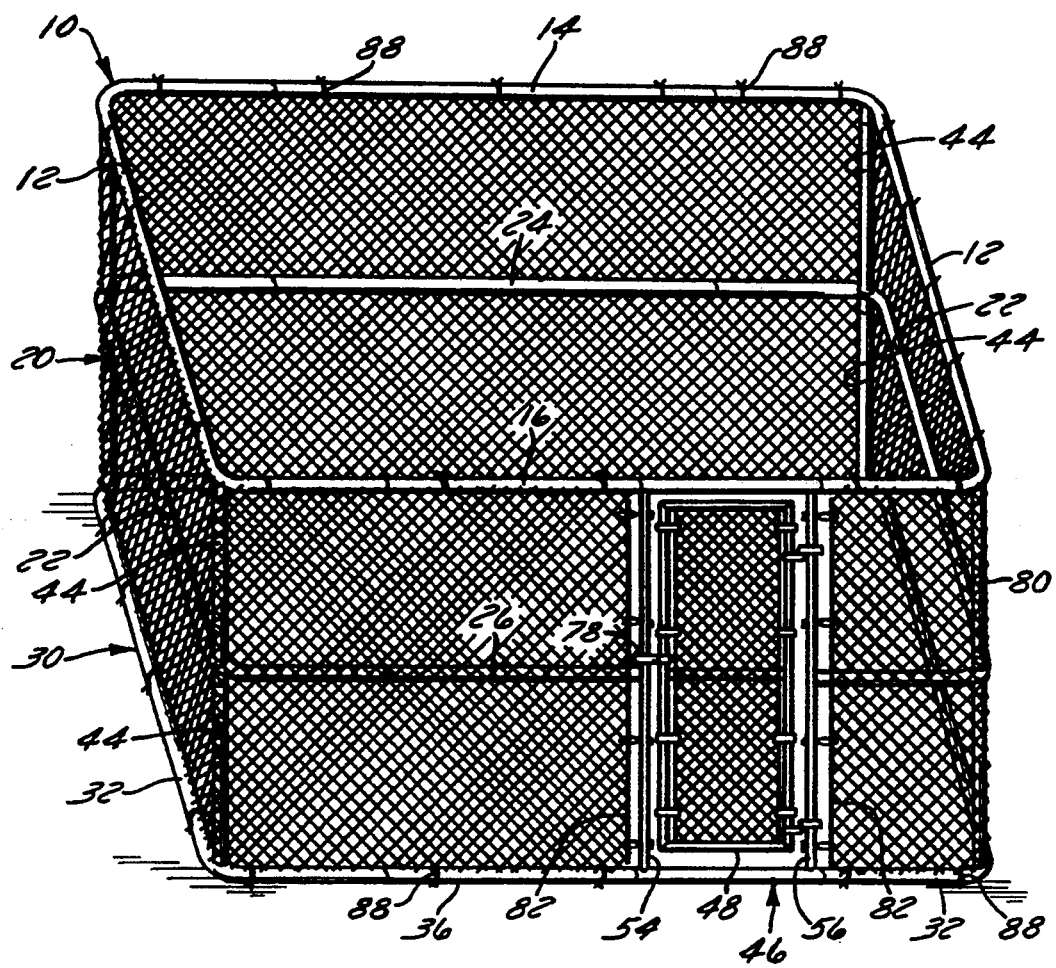
FIG. 2 is a perspective of the utility pen 1 when completely assembled.

As shown in FIG. 2, fencing fabric 80 may be unrolled from its container and has sufficient length to circumscribed the entire perimeter defined by the spaced apart rectangular configurations from column 54 to column 56. To provide tension to the fabric 80 (best seen In FIG. 3), tension rods 82 are inserted through the ends of the fabric mesh and eyes of eye bolts 84. The other ends of eye bolts 84 pass through openings in columns 54 and 56 and are secured there to by nuts 86. Rotation of nuts 86 to shorten or lengthen eye bolts 84 varies the tension in fabric 80 as desired. Tensioning of the fabric about the defined perimeter provides a uniform tension everywhere along the perimeter. The resultant force at each corner is toward the center of the pen and is resisted by the rectangular configurations formed by the rail sets 10, 20, and 30. Fabric 80 then may be unrolled and attached at the top and bottom to upper and lower rails 10 and 30 with wire ties 88.

As may be seen from a brief review of FIG. 2, the length of the unrolled length of flexible fence fabric is equal about to the sum of the following: (a) two times the length of the C-shaped members from elbow to elbow; (b) four times the length of the arms of the C-shaped members; (c) the length of the front rail; and (d) the length of the back rail. This permits the entire length of flexible material to be tensioned and stretched around the frame structure from one side of the gate assembly to another.

The material comprising the tubular structure of the various rails is desirably of a material strong enough to withstand the force of animals exerted against the confines of the pen. Preferably the tubes making up the various rails is 20 gauge galvanized steel with an outer diameter of about 1.315 inches. The various bosses are welded to their respective C-shaped rails. A suitable fencing fabric is made from wire galvanized before weaving that is woven into a fabric of about 2⅜ mesh and about 11½ gauge.

To provide compact packaging of the utility pen of the present invention, it is important to select the dimensions of the various components carefully. The selection of the various lengths of the tubing components permits concise packaging within the container. For example, to provide for a utility pen having a height of about 65 inches, a width of about six feet and a length of about ten feet, the length of the C-shaped rail members from elbow to elbow should be about six feet, i.e., the width of the pen. The end rails are preferably about six feet in length also. The shorter lengths of the C-shaped tubing from elbow to distal ends should be about 2 feet each. Thus, the sum of the two shorter lengths of the C-shaped rails and the back rails equals about ten feet in length, i.e., the length of the pen. The front rails should be about 4 feet in length while the gate frame should be about 2 feet in width. Thus, the length of the front of the pen is equal to the sum of the gate assembly width, two shorter lengths of the C-shaped tubing and front rail. This also equals about ten feet in length.

Reference is now made to FIGS. 4, 4A, 5 and 6 which represent various views of the C-shaped rails forming an internal support or skeleton shown generally by character numeral 90 within the outline of container 92. As can be seen in FIGS. 4, 5 and 6, container 92 takes the shape of a parallelpiped shaped container. It may be recalled that the internal diameter of bosses 13 and 25, respectively, are larger than external diameters of bosses 23 and 33. Additionally each of the bosses has a length larger than the external diameter of the tubing comprising the C-shaped rails. One of the pair of C-shaped rails 32 is placed on the bottom of container 92 with the long side paralleling and abutting the long side of the container with bosses 33 projecting upward. One of the pair of rails 22 is then positioned with bosses 25 in register with and covering bosses 33. Then one of the pair of rails 12 is similar positioned with bosses 13 registering with and covering bosses 23. In this manner a set 90a of spaced apart C-shaped rails is assembled within the container 92. Due to the length of bosses 13 and 23, the spacing gap 94 (best seen in FIG. 4) between the rails is slightly greater than the diameter of the rails. Set 90a abuts the long length of container 92. A second set 90b of the remainder of the rails of the C-shaped rails is then assembled abutting the other long wall of container 92. The shorter lengths or arms of the C-shaped rails of the sets can be interleaved because of spacing gap 94 as is best seen in FIG. 6. This also permits a more compact arrangement since the arms can overlap. Because gap 94 is only slightly larger than the diameter of the arms of the C-shaped rails, sagging of one set of rails against the other is minimized.

The height of frame 90 is essentially the same height as the container as best seen in the end view of FIG. 4. Frame 90 thus provides rigidity and resistance to pressure at the corners of the container. To prevent the interleaved dual frames from moving relative to one another while in container 92, a roll of fencing material 94 may be placed within the perimeter defined by the frames as shown in the top view of FIG. 6. The diameter of roll 94 is approximately the same as the internal width of container 92 measured from top to bottom surface and thus provides tangential contact with the surfaces of the container and support thereto. Thus roll 94, and the other fencing components, not only immobilizes frame 92 against movement within the container, but provides additional rigidity to the container along the tangential lines of contact of the roll with the container.

From the above, it is clear that the structure of the fence components, particularly the C-shaped rails, provide a plurality of desired functions. When assembled for packaging the initial frame provides for significant internal structure resisting pressure at the ends and corners of the container. The frame also minimizes shifting of the components within the container when being handled, Finally the C-shaped rails are positioned within the frame in the same orientation as in the utility pen assembly. Thus, the rails are easily identified, aiding considerably in the assembly of the utility pen.

It is understood that changes may be made in the construction and arrangement of the various components of the present invention without departing from the spirit or scope of the invention as defined in the following appended claims.

I claim:

1. A utility pen having a plurality of components, a portion of which cooperate to form a rigid internal structure for a parallelpiped shaped container when said components are in packaged form and housed within said container, said plurality of components when assembled into said pen comprising
 (a) a plurality of upper rails having first complimentary securing fittings for forming an essentially first rectangular configuration with a first gap when said first rails are fitted together;
 (b) a plurality of lower rails having second complimentary securing fittings for forming an essentially second rectangular configuration with a second gap when said rails are fitted together;
 (c) a plurality of upright members having a plurality of first coupling members adapted to couple with respective second coupling members on said first and second rails to secure said first and second rectangular configurations in a spaced apart relationship in which said first gap located immediately above said second gap;
 (d) a frame member adapted to be positioned with said first and second gaps when said rectangular configurations are assembled, said frame member further removably secured to said first and second rectangular configurations when in position and having a gate swingable between an open and shut position;
 (e) flexible fencing material capable of being rolled into a compact cylinder for positioning in said container within said internal frame structure and when said being unrolled for installation about the perimeter of said rectangular configurations, said fencing material secured to the having a length sufficient to be placed around the perimeter of said rectangular configurations;
 (f) fasteners for fastening said fencing material to said rectangular configurations; and
 (g) whereupon a portion of said component parts form said internal rigid structure within said container when said components of said utility pen are in packaged form, said portion of said component parts comprising (1) a first and second set of selected upper and lower rails, each of said selected rails having a long extension bending at the elbows at the ends thereof with an arm extending from each elbow and terminating at a distal end, (i) said first set of selected upper and lower rails abutting one side of said container along substantially the entire length of each of said long extensions thereof and held in a spaced apart relationship by said second coupling members, said arms of said first set of selected rails abutting sides of said container adjacent said one side, (ii) said second set of selected upper and lower rails abutting a side of said container opposite said one side along the entire length of said long extensions thereof and held in a spaced apart relationship from one another by said second coupling members, said arms of said second set abutting said adjacent sides of said container, and overlapping and being interleaved with said arms of said second set, and (iii) the remainder of components being positioned between said first and second sets of selected rails and maintaining said sets in a spaced apart relationship from one another within said container.

2. The pen of claim 1 including a plurality of intermediate rail members for forming a third essentially rectangular configuration positioned by said upright members intermediate said first and second configurations.

3. The pen of claim 1 including at least on upright member removably attached to one end of said fencing material and operably connected to the adjacent side of said frame member for selectively moving said one end to and from said adjacent side of said frame member thereby adjusting the tension in said fencing material.

4. The pen of claim 3 in which said tensioning member is a pair of upright members for selectively moving a selected end of said fencing material to and from a respective adjacent side of said frame member.

5. The pen of claim 4 in which said upright members are connected to a fastener rotably secured to said frame member.

6. In combination, a parallelpiped shaped container with a predetermined internal length and components of a fence assembly, said components capable of being disassembled and packaged within said container in which a portion of said components form an internal frame structure abutting the sides of said container, said portion of said components comprising (a) a first set of a plurality of hollow tubes each having an elongated section having elbows at each end thereof extending into a pair of arms terminating at distal ends, said tubes having an elbow length between the elbows of said tubes about equal to said internal length, said first set of tubes being arranged in a plurality of spaced apart rows by cooperating connecting elements mounted on each of said first set, said elongated sections of said first set of tubes abutting substantially the entire internal length of one side on said container;

(2) a second set of a plurality of each having an elongated section having elbows at each end thereof extending into a pair of arms terminating at distal ends, said second set of tubes having an elbow length between said elbows about equal to said internal length, and said second set of tubes being arranged in a spaced apart relationship by cooperating connecting elements mounted on each of said second set of tubes, said elongated sections of said second set of tubes abutting a side opposite said first side substantially the along the entire length thereof, said arms of said first set of tubes being interleaved with said arms of said second set of tubes wherein said first and second sets of tubes collectively form a rectangularly shaped perimeter.

7. The combination of claim 6 in which said connecting elements comprise a first group of annularly shaped bosses of a first diameter and a second group of annularly shaped bosses having a diameter less than said first predetermined diameter thereby allowing said first group of bosses to register with and enclose said second group of bosses.

8. The combination of claim 6 in which a roll of flexible fencing material is positioned within said perimeter and abuts the top and bottom walls of said container and said first and second sets.

9. The combination of claim 8 in which wherein said flexible fencing material has an unrolled length about equal to the sum of (i) three times said internal length,
   (ii) four times the arm length, and
   (iii) a third predetermined length less than said internal length.

* * * * *

UNITED STATES PATENT AND TRADEMARK OFFICE
CERTIFICATE OF CORRECTION

PATENT NO. : 5,354,036
DATED : October 11, 1994
INVENTOR(S) : Brown, Burgess J.

It is certified that error appears in the above-indentified patent and that said Letters Patent is hereby corrected as shown below:

Column 7, line 31, claim 3:

"on" should read --one--.

Signed and Sealed this

Thirteenth Day of December, 1994

Attest:

BRUCE LEHMAN

*Attesting Officer*  *Commissioner of Patents and Trademarks*